(12) United States Patent  (10) Patent No.: US 6,606,457 B2
Enomoto  (45) Date of Patent: Aug. 12, 2003

(54) FOCUSED IMAGE TREMBLE CORRECTING DEVICE

(75) Inventor: Shigeo Enomoto, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/173,162

(22) Filed: Jun. 18, 2002

(65) Prior Publication Data

US 2003/0007794 A1 Jan. 9, 2003

(30) Foreign Application Priority Data

Jun. 19, 2001 (JP) ........................................ 2001-184927

(51) Int. Cl.[7] ................................................ G03B 5/00
(52) U.S. Cl. ...................................................... 396/55
(58) Field of Search ........................... 396/55; 359/554, 359/557; 348/208.11

(56) References Cited

U.S. PATENT DOCUMENTS

| | | | | |
|---|---|---|---|---|
| 5,266,988 A | 11/1993 | Washisu | ........................ | 396/55 |
| 5,305,040 A | 4/1994 | Enomoto | ........................ | 396/55 |
| 5,541,693 A | 7/1996 | Enomoto | ........................ | 396/55 |
| 5,583,597 A | 12/1996 | Enomoto | ........................ | 396/55 |
| 5,655,157 A | 8/1997 | Enomoto | ........................ | 396/55 |
| 6,101,033 A | * 8/2000 | Kuno et al. | ................ | 396/55 X |
| 6,456,790 B2 | * 9/2002 | Sasaki et al. | .................. | 396/55 |

FOREIGN PATENT DOCUMENTS

JP  6-35022  2/1994  ............ G03B/5/00

* cited by examiner

Primary Examiner—W. B. Perkey
(74) Attorney, Agent, or Firm—Greenblum & Bernstein, P.L.C.

(57) ABSTRACT

A first rotating board is supported on a fixed member, being rotatable around a first pivot shaft. A second rotating board is supported on the first rotating board, being rotatable around a second pivot shaft. The first and second rotating boards are respectively rotated by first and second driving mechanisms. A lens holding member, which holds a correction lens, is fixed at an opening portion of the second rotating board. The lens holding member pierces through opening portions of the fixed member and the first rotating board. The first and second driving mechanisms are controlled such that a focused image tremble can be canceled by a combination of the displacement of the correction lens due to the rotation of the first rotating board and the displacement of the correction lens due to the rotation of the second rotating board.

10 Claims, 6 Drawing Sheets

FOCUSED IMAGE TREMBLE CORRECTING DEVICE

BACKGROUND OF THE INVENTION

1. Field of the Invention

This invention relates to a device which corrects a focused image tremble of an optical device due to hand tremble and so on.

2. Description of the Related Art

Conventionally, there are some optical devices, for example a camera, which are provided with a focused image tremble correcting device for correcting a focused image tremble due to a hand tremble and so on. The applicant suggests a correction optical system driving mechanism in the Japanese Unexamined Patent Publication (Kokai) No.6-35022 or in the U.S. Pat. No. 5,305,040. The driving mechanism moves a correction optical system, which forms an imaging optical system with other optical systems, on a plane perpendicular to the optical axis of the correction optical system. The driving mechanism moves the correction optical system in a direction on the plane such that the focused image tremble can be canceled. Namely, the tremble is corrected by moving the correction optical system on the above-mentioned plane such that trembles of the imaging optical system in two directions crossing at right angles (the vertical direction and the horizontal direction) can be canceled.

In the driving mechanism suggested in the above-mentioned publication, the correction optical system is rotated along the above-mentioned plane in order to simplify the mechanical structure so that the correction optical system can be driven using a small amount of power. The driving mechanism has a structure described below.

A first rotating board is mounted on a fixed board which is fixed in the optical device, being rotatable around a first rotating shaft. A second rotating board is mounted on the first rotating board, being rotatable around a second rotating shaft. A lens supporting member, which supports the correction optical system, is provided in such a manner that the lens supporting member penetrates through the fixed board, and the first and second rotating board. The first and second rotating shafts are situated so as to be parallel to the optical axis of the correction optical system. The first and second rotating boards are respectively rotated by corresponding driving machines.

In this correcting device, as described in the above-mentioned publication, the amounts of rotation of the rotating boards are calculated based on a linear-approximation. Namely, the linear moving component of the focused image in the horizontal direction is canceled by the displacement of the first rotating board in the horizontal direction defined by the rotation of the first rotating board, and the linear moving component of the focused image tremble in the vertical direction is canceled by displacement of the second rotating board in the horizontal direction defined by the rotation of the second rotating board.

As described above, the amount each of the first and second rotating boards is driven in either the horizontal and vertical directions is controlled by the corresponding amount of rotation of the first and second rotating boards, which is calculated by using linear-approximation, with respect to each of the linear moving components of the focused image in the horizontal and vertical directions. In other words, the tremble correction is carried out by assigning an amount of rotation of one rotating board to one linear moving component. In this specification, this driving control is referred to as "pseudo-linear movement".

However, in this mechanism, if the distance between the rotating shafts and the optical axis of the correction optical system is set short to reduce the size of the device, the error in the linear-approximation is amplified, and the accuracy of the amount each rotating board is driven is lowered.

Further, the second rotating board is mounted on the first rotating board, and the pseudo-linear movement is carried out with respect to each of the first and second rotating boards. Accordingly, with respect to one rotating board, the pseudo-linear movement is performed without considering an error generated by rotating the other rotating board, and further with respect to the other rotating board, the pseudo-linear movement is performed without considering the error generated by rotating the first rotating board. Therefore, the total error is amplified.

Accordingly, it is difficult to compact the focused image tremble correcting device, so that the overall size of the optical device cannot be reduced. Namely, though the optical device is required to be small from the viewpoints of manipulation and portability, such requirement cannot be achieved.

SUMMARY OF THE INVENTION

Therefore, an object of the present invention is to provide a focused image tremble correcting device which is simple and small, and further accurately corrects a focused image tremble.

In accordance with an aspect of the present invention, there is provided a focused image tremble correcting device comprising: a tremble detector that detects a tremble of an optical device; a correction optical system that is included in an imaging optical system of the optical device and corrects the tremble; a fixed member that is fixed in the optical device; a first rotating member that is supported on the fixed member and rotates the correction optical system around a first rotating axis which is parallel to an optical axis of the correction optical system; a second rotating member that is supported on the first rotating member and rotates the correction optical system around a second rotating axis which is parallel to the optical axis of the correction optical system; and a controller. The controller calculates a moving component for an object image in a first linear direction on a focal plane of the imaging optical system. The moving component is due to an angular tremble of the optical axis of the imaging optical system. The calculation is based on the result of the tremble detector. Further, the controller cancels the moving component in the first linear direction by controlling rotations of both the first rotating member and the second rotating member.

Preferably, the controller further calculates a moving component in a second linear direction on the focal plane, and calculates a rotational angle for each of the first and second rotating members in order to control both the first and second rotating members such that both the moving component of the object image in the first linear direction and the moving component of the object image in the second linear direction can be canceled. The first and second linear directions cross on the focal plane.

Optionally, the first linear direction and the second linear direction cross at right angles, and the intersection point of the first and second linear direction corresponds to an intersection point of the optical axis of the imaging optical system and the focal plane.

Preferably, the controller calculates the rotational angles of the first and second rotating members such that the moving component in the first linear direction, the moving component in the second linear direction, the rotational angle of the first rotating member, and the rotational angle of the second rotating member satisfy the formulas to follow.

$$x = K1 \times (L2 \times \cos(\delta + \theta + \alpha 2) + L1 \times \sin(\alpha 1 + \theta))$$

$$y = K2 \times (L2 \times \sin(\delta + \theta + \alpha 2) - L1 \times \cos(\alpha 1 + \theta) + d1)$$

(herein, x: moving component of the object image in the first linear direction,
y: moving component of the object image in the second linear direction,
K1: predetermined proportional coefficient,
K2: predetermined proportional coefficient,
L1: length of a straight line which connects the intersection point of the first rotating axis and the focal plane with the intersection point of the second rotating axis and the focal plane,
L2: length of a straight line which connects the intersection point of the optical axis of the correction optical system and the focal plane with the intersection point of the second rotating axis and the focal plane,
θ: rotational angle of the first rotating board,
δ: rotational angle of the second rotating board,
α1: an angle when the second linear direction is rotated in the clockwise direction to a straight line which connects the intersection point of the first rotating axis and the focal plane with the intersection point of the second rotating axis and the focal plane, around the intersection point of the first rotating axis and the focal plane,
α2: an angle when the first linear direction is rotated in the clockwise direction to a straight line which connects the intersection point of the optical axis of the imaging optical system and the focal plane with the intersection point of the second rotating axis and the focal plane, around an intersection point of the first linear direction and the second linear direction,
d1: distance between the intersection point of the first rotating axis and the focal plane and the intersection point of the optical axis of the imaging optical system and the focal plane)
optionally, when the optical axis of the correction optical system is coaxial with an optical axis of other optical systems included in the imaging optical system, a straight line, which connects an intersection point of the first rotating axis and a plane perpendicular to the optical axis of the correction optical system with an intersection point of the optical axis of the correction optical system and the perpendicular plane, and a straight line, which connects an intersection point of the second rotating axis and the perpendicular plane with an intersection point of the optical axis of the correction optical system and the perpendicular plane, do not cross at right angles.

Preferably, the focused image tremble correcting device further comprises: a first driving mechanism including: a first driving member for rotating the first rotating member around the first rotating axis; and a first urging member for urging the first rotating member to the first driving member; and a second driving mechanism including: a second driving member for rotating the second rotating member around the second rotating axis; and a second urging member for urging the second rotating member to the second driving member.

For example, the first driving member is a stepping motor which is fixed on said fixed member; the first urging member is a coil spring, one end of which is fixed on the fixed member and the other end of which is fixed on the first rotating member; the second driving member is a stepping motor which is fixed on the first rotating member; and the second urging member is a coil spring, one end of which is fixed on the first rotating member and the other end of which is fixed on the second rotating member.

Preferably, the focused image tremble correcting device further comprises: a first supporting mechanism that includes: a first pivot shaft, the rotating axis of which is the first rotating axis, the first pivot shaft being fixed on the first rotating member, and one end of the first pivot shaft being in contact with a first bearing which is provided on the fixed member; a first elastic member, being flat, that is provided with a second bearing with which the other end of the first pivot shaft is in contact; and a first supporting element, being fixed on the fixed member, that supports the first elastic member in such a manner that an elastic power of the first elastic member is applied to the first pivot shaft at all times such that the first pivot shaft is urged to the fixed member; and a second supporting mechanism that includes: a second pivot shaft, the rotating axis of which is the second rotating axis, the second pivot shaft being fixed on the second rotating member, and one end of the second pivot shaft being in contact with a third bearing which is provided on the first rotating member; a second elastic member, being flat, that is provided with a fourth bearing with which the other end of the second pivot shaft is in contact; and a second supporting element, being fixed on the first rotating member, that supports the second elastic member in such a manner that the elastic power of the second elastic member is applied to the second pivot shaft at all times such that the second pivot shaft is urged to the first rotating member.

More preferably, the one end and the other end of the first pivot shaft are cone-shaped, the first bearing of the fixed member and the second bearing of the first elastic member are tapered, the first pivot shaft is positioned in such a manner that the one end of the first pivot shaft is abutted against the center of the first bearing and the other end of the first pivot shaft is abutted against the center of the second bearing, the one end and the other end of the second pivot shaft are cone-shaped, the third bearing of the first rotating member and the fourth bearing of the second elastic member are tapered, the second pivot shaft is positioned in such a manner that the one end of the second pivot shaft is abutted against the center of the third bearing and the other end of the second pivot shaft is abutted against the center of the fourth bearing.

According to the present invention, in the focused image tremble correcting device which rotates the correction optical system around two different axes, the moving component of the object image in the first linear direction on the focal plane, due to the angular tremble of the optical axis of the imaging optical system, is canceled by rotating both the first rotating board and the second rotating board. Accordingly, accurate correction of the focused image tremble can be carried out at all times.

Further, the mechanism according to the present invention cancels the displacement of the object image by combining the rotations of two rotating boards. Accordingly, it is not necessary to make the distance between the first rotating axis and the correction optical system large and nor is it necessary to make the distance between the second rotating axis and the correction optical system large, in order to heighten the accuracy of the correction. Namely, the overall size of the optical device can be small.

When the first rotating board is supported on the fixed member by the elastic power of the first elastic member which is flat, the position of the first rotating board is accurately held in the direction along the optical axis of the correction optical system. Similarly, when the second rotating board is supported on the first rotating board by the elastic power of the second elastic member which is flat, the position of the second rotating board is accurately held in the direction along the optical axis of the correction optical system. Namely, the planes of the first and second rotating boards are prevented from tilting with respect to the optical axis, so that the correction of the focused image tremble is stably carried out.

Further, when both ends of the first pivot shaft are cone-shaped and the bearings of the fixed member and the first elastic member are tapered, and the first pivot shaft is positioned such that both ends are abutted against the center of the corresponding bearings, the rotational friction of the first rotating board is reduced. Accordingly, the first rotating board can be smoothly rotated, so that controlling the amount the first rotating board is driven can be accurately carried out.

Similarly, when both ends of the second pivot shaft are cone-shaped and the bearings of the first rotating board and the second elastic member are tapered, and the second pivot shaft is positioned such that both ends are abutted against the center of the corresponding bearings, the rotational friction of the second rotating board is reduced. Accordingly, the second rotating board can be smoothly rotated, so that controlling of the amount the second rotating board is driven can be accurately carried out.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
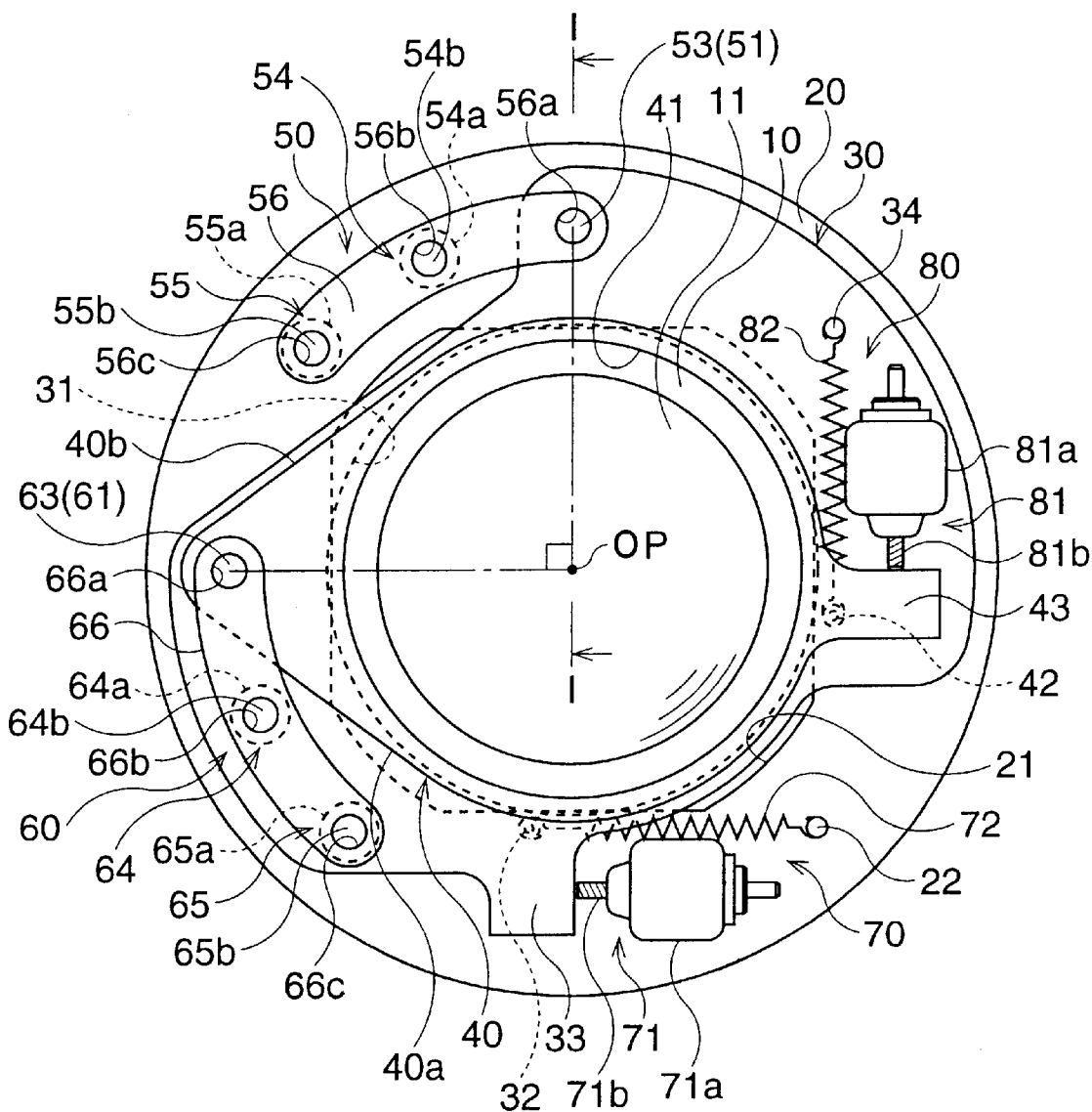
FIG. 1 is a front view of a correction lens driving mechanism, to which a first embodiment, according to the present invention, is applied.

The present invention will now be described with reference to embodiments shown in the drawings.

Figure 2:
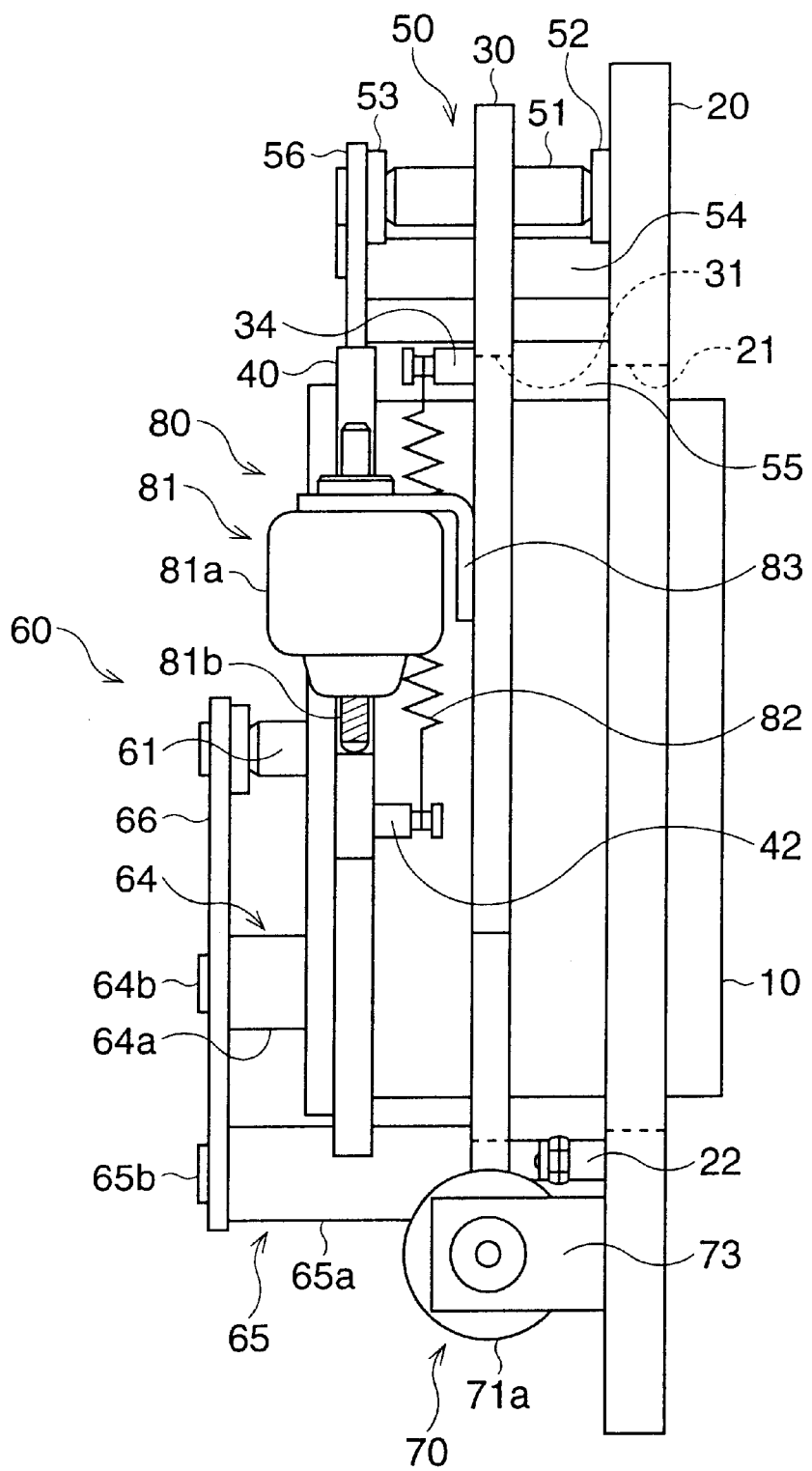
FIG. 2 is an enlarged side view of the correction lens driving mechanism of FIG. 1.

FIG. 1 is a front view of a correction lens driving mechanism, to which a first embodiment, according to the present invention, is applied. FIG. 2 is an enlarged side view of the correction lens driving mechanism. The correction lens driving mechanism is mounted in, for example, a camera (not shown).

A lens holding member 10 has a generally cylindrical shape. A correction lens 11 is held in the lens holding member 10. A fixed board 20, a first rotating board 30, and a second rotating board 40 are thin plates. These boards are placed at predetermined spaces such that the first rotating board 30 is positioned between the fixed board 20 and the second rotating board 40.

The fixed board 20 has a circular configuration. The fixed board 20 is fixed in the camera by a mounting mechanism. A generally rectangular opening portion 21 is formed at approximately the center of the fixed board 20. The lens holding member 10 pierces through the opening portion 21.

The first rotating board 30 has a configuration in which some portions of a circular plate are removed. A circular opening portion 31 is formed at approximately the center of the first rotating board 30. The lens holding member 10 pierces through the opening portion 31.

The second rotating board 40 has a configuration in which a piercing portion 40a and a supporting portion 40b are unitarily formed. A piercing portion 40a is approximately circular and the supporting portion 40b is approximately triangular. An opening portion 41, with which the lens holding member 10 is engaged, is formed at approximately the center of the piercing portion 40a. The lens holding member 10 is fixed in the opening portion 41.

The first rotating board 30 is mounted on the fixed board 20 by a first mounting mechanism 50. The first mounting mechanism 50 includes a first pivot shaft 51, bearings 52 and 53, supporting poles 54 and 55, and a flat spring 56.

The flat spring 56 is obtained by forming a circular arc along the periphery of the fixed board 20 with an elastic member. The supporting poles 54 and 55 are provided on the plane, of the fixed board 20, which faces the first rotating board 30. The supporting poles 54 and 55 are positioned at a portion, which is close to the first pivot shaft 51 and corresponds to the removed portion of the first rotating board 30, being arranged in accordance with the shape of the flat spring 56. One end of each of the supporting poles 54 and 55 is fixed on the fixed board 20. The other end of the supporting poles 54 and 55 is fixedly engaged with holes formed on the flat spring 56, as will be described later. Namely, both ends of the flat spring 56 are respectively supported by the first pivot shaft 51 and the supporting pole 55, and the center of the flat spring 56 is supported by the supporting pole 54.

Figure 3:
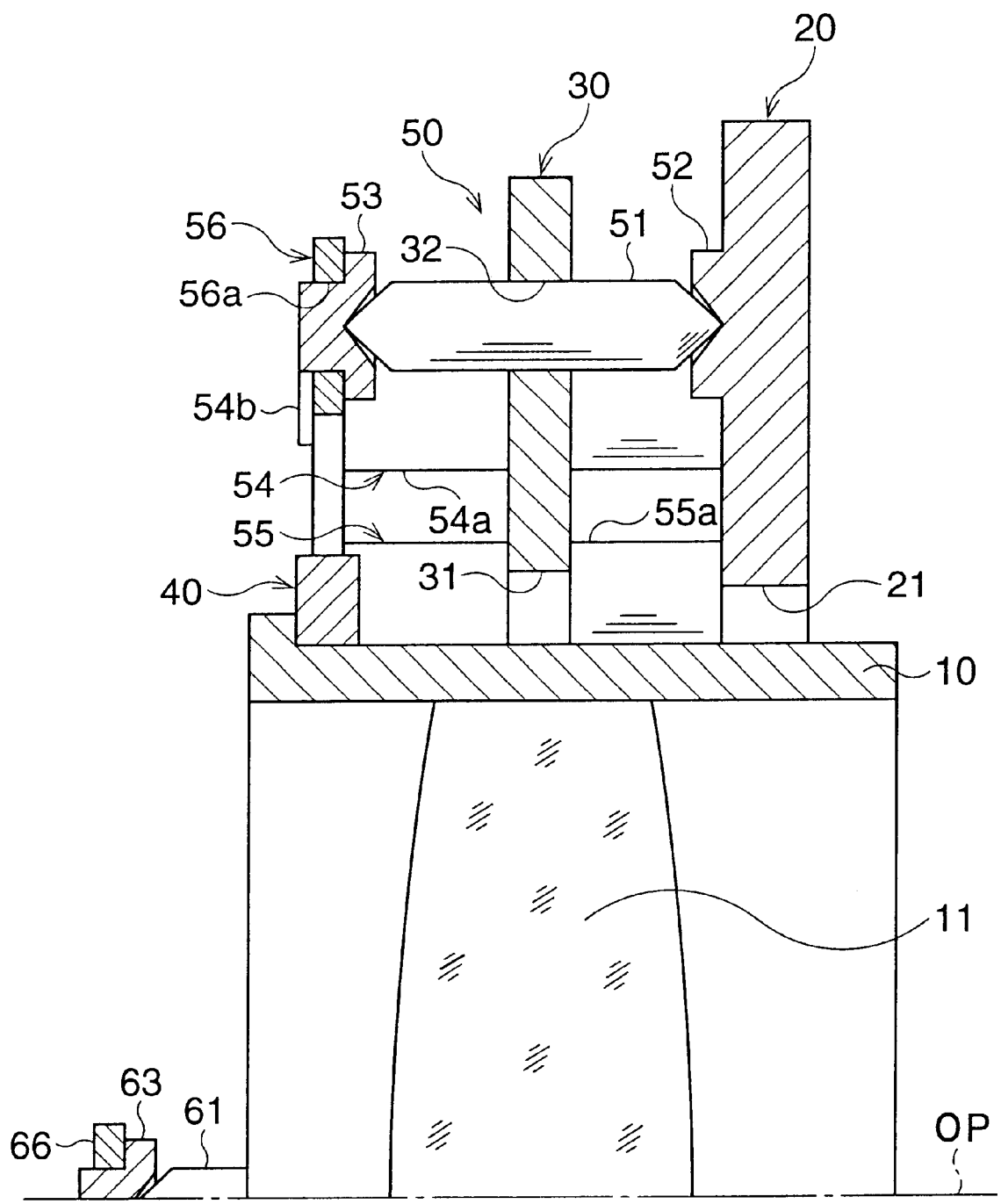
FIG. 3 is a sectional view taken in the direction of the arrows substantially along the line I—I of FIG. 1.

FIG. 3 is a sectional view taken in the direction of the arrows substantially along the line I—I of FIG. 1. In FIG. 3, the upper portion from the optical axis OP of the correction lens 11 is depicted. The first pivot shaft 51 pierces through the hole 32 which is formed close to the periphery of the first rotating board 30. The first pivot shaft 51 is fixedly engaged with the hole 32. Both ends of the first pivot shaft 51 are cone-shaped. The bearing 52 is formed on the plane of the fixed board 20 which faces the first rotating board 30. The bearing 52 is placed at a position which corresponds to the first pivot shaft 51, being unitarily formed with the fixed board 20. The bearing 53 is fixedly engaged with a hole 56a of the flat spring 56. The hole 56a is formed at a position which corresponds to the first pivot shaft 51. The bearings 52 and 53 include a recess portion which is tapered. Namely, the recess portions have a hollowed out cone shape. The first pivot shaft 51 is placed in such a manner that the tips of both ends of the shaft 51 abut against the center of the recess portion of the bearings 52 and 53.

The supporting pole 54, which is generally cylindrically-shaped, includes a body 54a and a head 54b the diameter of which is smaller than that of the body 54a. The head 54b is fixedly engaged with a hole 56b (see FIG. 1) which is formed in the flat spring 56. The bottom outer surface of the body 54a, on which the head 54b is formed, is in contact with the flat spring 56. Similarly, the supporting pole 55, which is generally cylindrically-shaped, includes a body 55a and a head 55b (see FIG. 1) the diameter of which is smaller than that of the body 55a. The head 55b is fixedly engaged with a hole 56c (see FIG. 1) which is formed in the flat spring 56. The bottom outer surface of the body 55a is in contact with the flat spring 56. Namely, the distance between the fixed board 20 and the flat spring 56 is defined by the supporting poles 54 and 55.

The first pivot shaft 51, and the supporting poles 54 and 55 are provided such that the axes are parallel to the optical axis OP of the correction lens 11. Further, the distance between the fixed board 20 and the flat spring 56 is defined by the supporting poles 54 and 55 so that the length along the optical axis OP between the centers of the recess portions of the bearings 52 and 53 is slightly shorter than the length between the tips of both ends of the first pivot shaft 51. Accordingly, an urging force (elastic power) of the flat spring 56 is applied to the first rotating board 30 at all times, urging the first rotating board 30 in the direction toward the fixed board 20. In other words, the first pivot shaft 51 is pressed to the fixed board 20 by the flat spring 56 at all times so as to be in contact with the fixed board 20.

As described above, both ends of the first pivot shaft 51 are abutted against the tapered recess portions of the bearing 52 and 53. The first pivot shaft 51 is pressed by the flat spring 56 so as to be in contact with the fixed board 20. Accordingly, a rotational friction of the first pivot shaft 51 is reduced, so that the rotation of the first pivot shaft 51 is not obstructed by rotational friction. Namely, the first rotating board 30 is supported on the fixed board 20, being rotatable around the first pivot shaft 51.

As shown in FIGS. 1 and 2, the second rotating board 40 is mounted on the first rotating board 30 by a second mounting mechanism 60 similar to the first mounting mechanism 50. The second mounting mechanism 60 includes a second pivot shaft 61, a flat spring 66, a bearing (not shown) which is unitarily formed in the first rotating board 30, a bearing 63 formed in the flat spring 66, and supporting poles 64 and 65 which are cylindrically-shaped. The flat spring 66 has a configuration of a circular arc along the periphery of the first rotating 30.

As shown in FIG. 1, the second pivot shaft 61 is placed at a position which is rotated counterclockwise by 90 degrees from the first pivot shaft 51. In FIG. 1, on a plane perpendicular to the optical axis OP, two straight lines are depicted by semi broken lines. One straight line connects the optical axis OP and the point of intersection of the perpendicular plane and the axis of the first pivot shaft 51, and another straight line connects the optical axis OP and the point of intersection of the perpendicular plane and the axis of the second pivot shaft 61. As shown in FIG. 1, the first and second pivot shafts 51 and 61 are positioned such that the two straight lines cross at 90 degrees and the lengths of the two straight lines are equal.

The second pivot shaft 61 pierces through a hole (not shown) which is formed near the tip of the supporting portion 40b of the second rotating board 40. The second pivot shaft 61 is fixedly engaged with the hole.

The bearing unitarily formed with the first rotating board 30 is on the surface of the board 30 which faces the second rotating board 40. This bearing is positioned so as to correspond to the second pivot shaft 61. The other bearing 63 on the flat spring 66 is fixed at a position which corresponds to the second pivot shaft 61. Both ends of the second pivot shaft 61 are cone-shaped (not shown), similar to those of the first pivot shaft 51. Similar to the first mounting mechanism 50, the bearing of the first rotating board 30 and the bearing 63 include a recess portion which is tapered. Namely, the recess portions have a hollowed out cone shape. The second pivot shaft 61 is positioned such that the tip of one end is abutted against the center of the recess portion of the bearing of the first rotating board 30, and the tip of another end is abutted against the center of the recess portion of the bearing 63.

The supporting poles 64 and 65 are provided on the first rotating board 30. The supporting poles 64 and 65 are positioned close to the second pivot shaft 61, being arranged in accordance with the shape of the flat spring 66. Namely, the both ends of the flat spring 66 are respectively supported by the second pivot shaft 61 and the supporting pole 65, and the center of the flat spring 66 is supported by the supporting pole 64.

One end of each of the supporting poles 64 and 65 is fixed on the first rotating board 30. Similar to the structure of the flat spring 56 and the supporting poles 54 and 55 of the first mounting mechanism 50, the other end 64b of the supporting pole 64 is fixedly engaged with a hole 66b formed in the flat spring 66, and the other end 65b of the supporting pole 65 is fixedly engaged with a hole 66c formed in the flat spring 66.

Namely, the distance between the first rotating board 30 and the flat spring 66 is defined by the supporting poles 64 and 65.

The second pivot shaft 61, and the supporting poles 64 and 65 are provided such that the axes are parallel to the optical axis OP of the correction lens 11. The distance between the first rotating board 30 and the flat spring 66 is defined by the supporting poles 64 and 65 such that the second pivot shaft 61 is pressed and is in contact with the first rotating board 30 by the urging force of the flat spring 66.

Both ends of the second pivot shaft 61 are abutted against the center of the tapered recess portion of the corresponding bearings. Accordingly, the second pivot shaft 61 is in contact with the first rotating board 30, being pressed by the flat spring 66, the rotational friction of the second pivot shaft 61 is reduced, and the rotation of the second pivot shaft 61 is not obstructed by rotational friction. Namely, the second rotating board 40 is supported on the first rotating board 30, being rotatable around the second pivot shaft 61.

The diameter of the opening portion 21 of the fixed board 20 and the opening portion 31 of the first rotating board 30 is larger than the outer diameter of the lens holding member 10, so that the rotation of the first and second rotating boards 30 and 40 is not obstructed. In other words, the movement range of the lens holding member 10 is defined by the inner surface of the opening portions 21 and 31.

Note that, in FIG. 1, the lens holding member 10 is situated in a state where the optical axis OP of the correction lens 11 is coaxial with the optical axes of the other optical systems which construct a photographing optical system (imaging optical system) of the camera. In this specification, this position of the lens holding member 10 is referred to as the "standard position".

The first rotating board 30 is rotated by a first driving mechanism 70, which is provided at a position opposite to the first pivot shaft 51 with the optical axis OP between. The first driving mechanism 70 includes a first stepping motor 71 and a first coil spring 72. The first stepping motor 71 is a linear stepping actuator of the direct-drive-type. The first stepping motor 71 includes a rotor (not shown) which is provided in a motor case 71a and a shaft 71b. The rotor is driven by pulse signals. The shaft 71b is moved along the longitudinal axis thereof in accordance with the rotation of the rotor in the forward and reverse directions. When the rotor is rotated in the forward direction, the shaft 71b extends along the longitudinal axis, and when the rotor is rotated in the reverse direction, the shaft 71b retracts along the longitudinal axis. As shown in FIG. 2, the motor case 71a is fixed on the fixed board 20 by a mounting board 73.

One end of the first coil spring 72 is hooked with a pin 22 provided on the surface, of the fixed board 20, which faces the first rotating board 30. Another end of the first coil spring 72 is hooked with a pin 32 provided on the surface, of the first rotating board 30, which faces the fixed board 20. Namely, the coil spring 72 always urges the first rotating board 30 in the counterclockwise direction around the first pivot shaft 51 in FIG. 1. Accordingly, a ball provided at the tip of the shaft 71b is abutted against a side surface of a pressed portion 33 of the first rotating board 30, at all times.

When the rotor of the first stepping motor 71 is rotated in the forward direction, the first rotating board 30 is rotated in the clockwise direction around the first pivot shaft 51 in FIG. 1, and when the rotor is rotated in the reverse direction, the first rotating board 30 is rotated in the counterclockwise direction around the first pivot shaft 51 in FIG. 1. Accordingly, the rotation of the first rotating board 30 can be controlled by controlling the driving pulses of the first stepping motor 71.

As shown in FIG. 1, the second rotating board 40 is rotated by a second driving mechanism 80, which is provided at a position opposite to the second pivot shaft 61 with the optical axis OP between. Similar to the first driving mechanism 70, the second driving mechanism 80 includes a second stepping motor 81 which is a linear stepping actuator of the direct-drive-type and a second coil spring 82. When a rotor of the second stepping motor 81 is rotated in the forward direction, the shaft 81b extends along the longitudinal axis thereof, and when the rotor is rotated in the reverse direction, the shaft 81b retracts along the longitudinal axis. As shown in FIG. 2, the motor case 81a is fixed on the first rotating board 30 by a mounting board 83.

One end of the coil spring 82 is hooked to a pin 34 provided on a surface, of the first rotating board 30, which faces the second rotating board 40, and the other end of the coil spring 82 is hooked to a pin 42 provided on a surface, of the second rotating board 40, which faces the first rotating board 30. The coil spring 82 always urges the second rotating board 40 in the counterclockwise direction around the second pivot shaft 61. Accordingly, a ball provided at the tip of the shaft 81b is abutted against a side surface of a pressed portion 43 (see FIG. 1) of the second rotating board 40, at all times.

When the rotor of the second stepping motor 81 is rotated in the forward direction, the second rotating board 40 is rotated in the clockwise direction around the second pivot shaft 61 in FIG. 1, and when the rotor is rotated in the reverse direction, the second rotating board 40 is rotated in the counterclockwise direction around the second pivot shaft 61 in FIG. 1. Accordingly, the rotation of the second rotating board 40 can be controlled by controlling driving pulses of the second stepping motor 81.

The correction lens driving mechanism shown in FIGS. 1 through 3 is provided in a camera such that the correction lens 11 is included in the photographing optical system.

When the focused image tremble does not occur, or when the correction of the tremble is not performed, the correction lens 11 is kept at the standard position.

Figure 4:
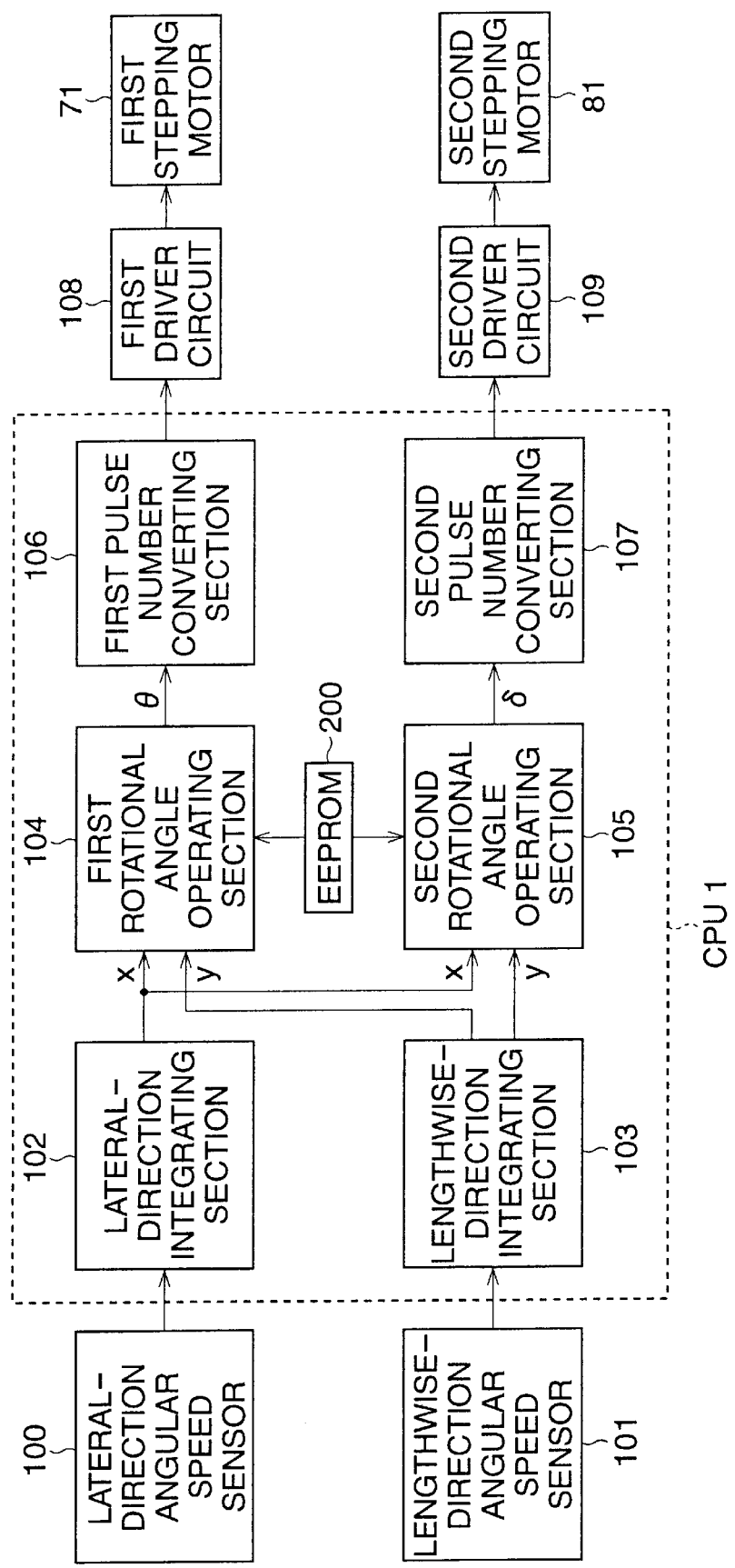
FIG. 4 is a block diagram of the driving control of the correction lens.

FIG. 4 is a block diagram of the driving control of the correction lens 11 in the first embodiment. A lateral-direction angular speed sensor 100 detects the direction and the angular speed of the tremble of the camera for the lateral direction. A lengthwise-direction angular speed sensor 101 detects the direction and the angular speed of the tremble of the camera for the lengthwise direction. For example, a piezoelectric gyro sensor is utilized for the lateral-direction angular speed sensor 100 and for the lengthwise-direction angular speed sensor 101.

After output signals from the angular speed sensor 100 are amplified and converted to digital signals, the digital signals are input to a CPU 1 which is indicated by a broken line. Then, in the lateral-direction integrating section 102, the digital signals are integrated, and angular displacement data x of the photographing optical system in the lateral direction are calculated.

Similarly, after output signals from the angular speed sensor 101 are amplified and converted to digital signals, the digital signals are integrated in a lengthwise-direction integrating section 103, and angular displacement data y of the photographing optical system in the lengthwise direction are calculated.

A first rotational angle operating section 104 is a section for calculating the rotational angle θ of the first rotating board 30, and a second rotational angle operating section 105 is a section for calculating the rotational angle δ of the second rotating board 40. The lateral-direction angular displacement data "x" are input to the first rotational angle operating section 104 and the second rotational angle operating section 105. Similarly, the lengthwise-direction angular displacement data "y" are input to the first operating section 104 and the second operating section 105.

In an EEPROM 200, a table, which indicates relations between the data of the angular displacements (x and y) and the rotational angles (θ and δ), is installed. Note that, the rotational angles θ and δ correspond to rotating amounts necessary for canceling the angular displacements (x and y)

In the first rotational angle operating section 104, the rotating angle θ of the first rotating board 30 is calculated by searching the table of the EEPROM 200 based on the angular displacements x and y, and in the second rotational angle operating section 105, the rotating angle δ of the second rotating board 40 is calculated by searching the table of the EEPROM 200 based on the angular displacements x and y. Note that, the relations between the angular displacements (x and y) and the rotating angles (θ and δ) of the first and second rotating boards 30 and 40 will be explained below.

The rotating angle θ of the first rotating board 30, which is calculated in the first operating section 104, is input to a first pulse number converting section 106. In the section 106, the rotating angle θ is converted to a driving pulse number for the first stepping motor 71. Similarly, the rotating angle δ of the second rotating board 40, which is calculated in the second operating section 105, is input to a second pulse number converting section 107, and in the section 107, the rotating angle δ is converted to a driving pulse number for the second stepping motor 81.

The driving pulse number of the first stepping motor 71, which is calculated in the first converting section 106, is output from the section 106 as an input signal for a first driver circuit 108 which is an outer circuit connected to the CPU1. Similarly, the driving pulse number of the second stepping motor 81, which is calculated in the second converting section 107, is output from the section 107 as an input signal for a second driver circuit 109 which is an outer circuit connected to the CPU1.

After the input signals are subjected to predetermined signal operations in the first and second driver circuits 108 and 109, the operated signals are respectively output to the first and second stepping motors 71 and 81 as driving currents.

Figure 5:
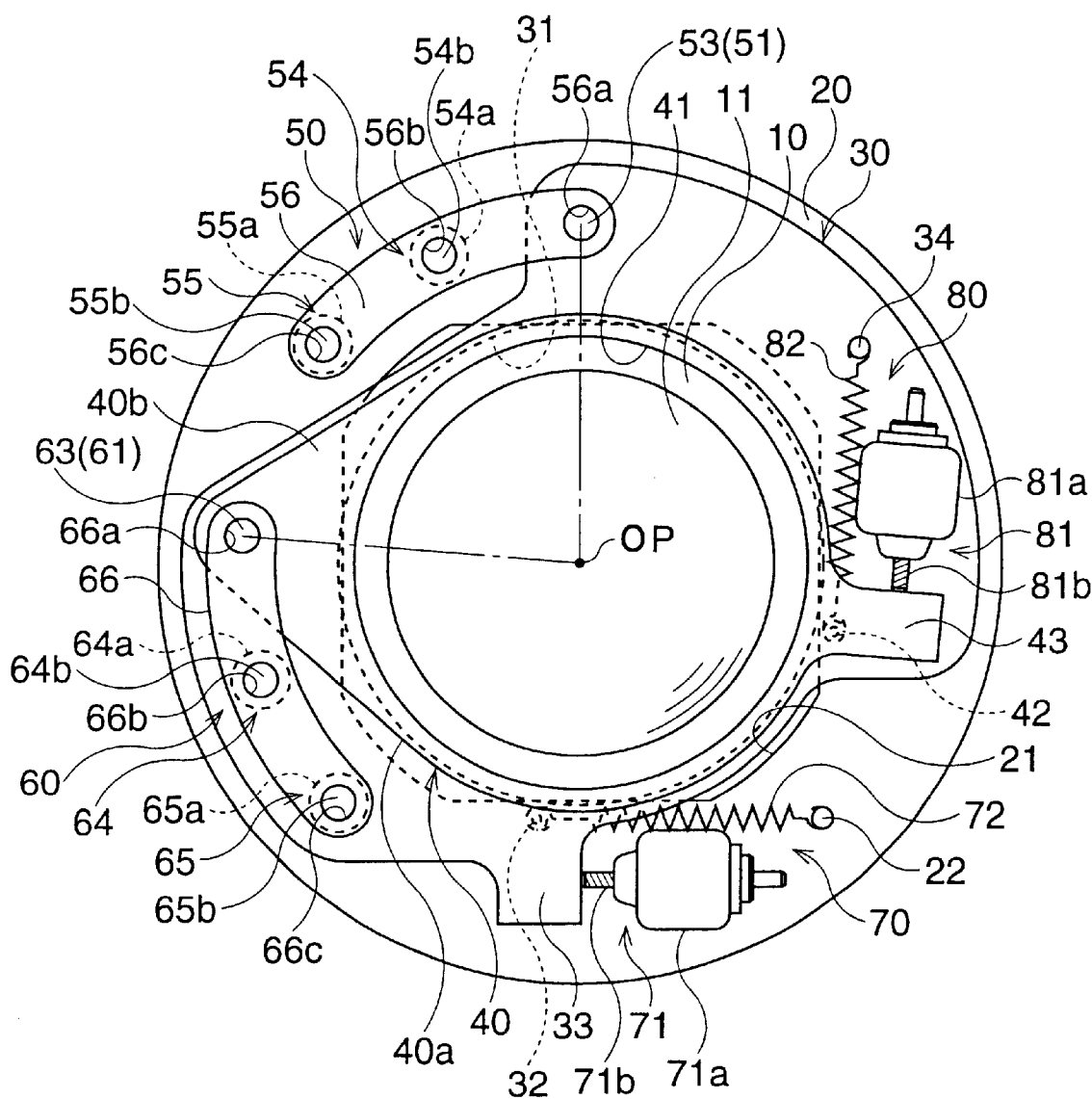
FIG. 5 is a front view of a correction lens driving mechanism, to which a second embodiment, according to the present invention, is applied.

FIG. 5 is a front view of a correction lens driving mechanism, to which a second embodiment, according to the present invention, is applied. In FIG. 5, components utilized in the first embodiment, which are identical in the second embodiment, share the same reference numerals. Further, FIG. 5 shows that the lens holding member 10 is situated at the standard position, similar to FIG. 1.

Similar to FIG. 1, in FIG. 5, on the plane perpendicular to the optical axis OP, two straight lines are depicted by semi broken lines. One straight line connects the optical axis OP and the point of intersection of the perpendicular plane and the axis of the first pivot shaft 51, and another straight line connects the optical axis OP and the point of intersection of the perpendicular plane and the axis of the second pivot shaft 61. As shown in FIG. 5, when the lens holding member 10 is situated at the standard position, the first and second pivot shafts 51 and 61 are positioned such that the two straight lines cross at degrees less than 90 degrees.

In the second embodiment, the other structures are similar to those of the first embodiment. Further, the driving control of the first and second rotating boards 30 and 40 is similar to the before-mentioned control of the first embodiment which is explained using the block diagram of FIG. 4.

Figure 6:
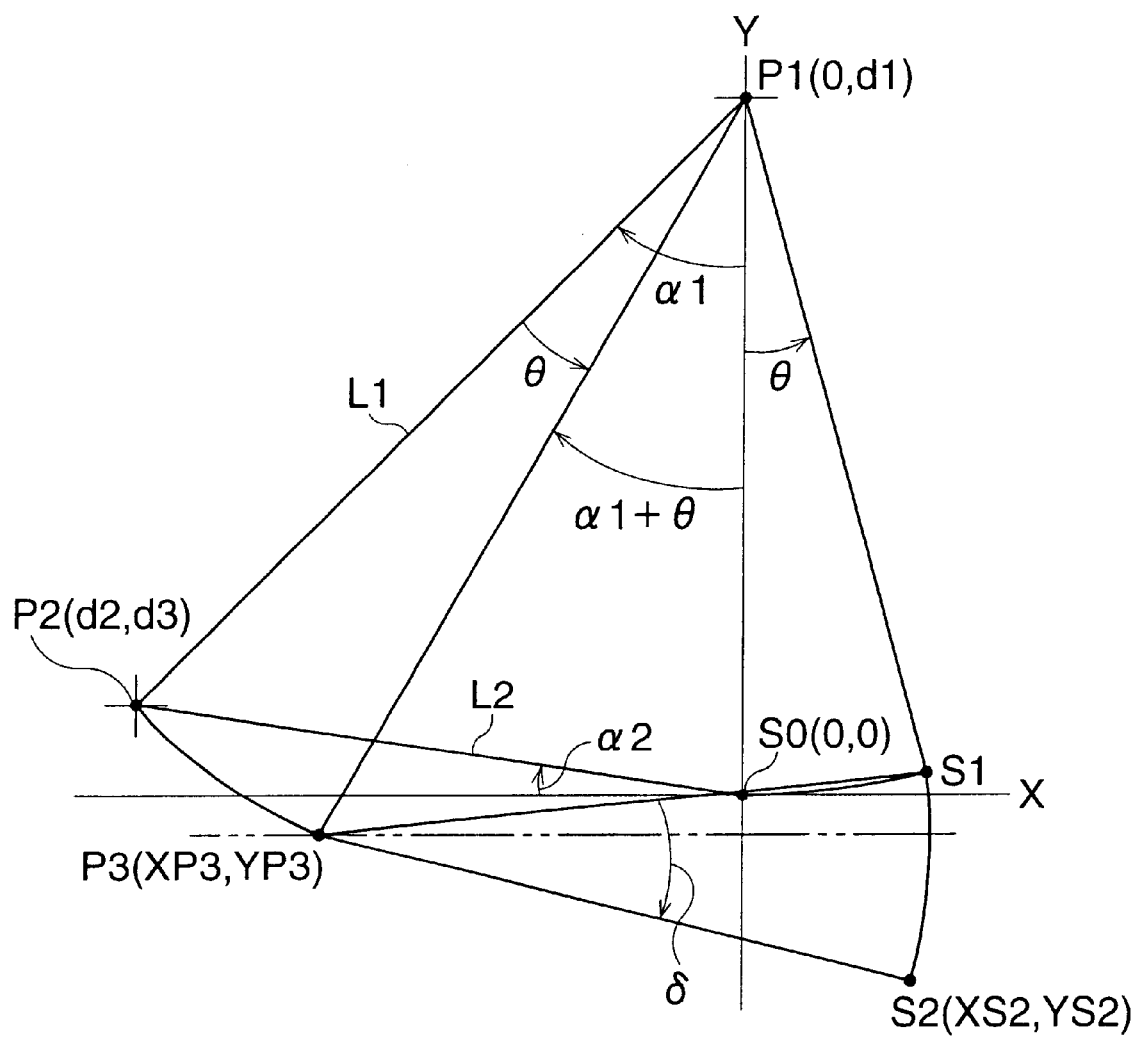
FIG. 6 is a view showing the positional relationship, on a focal plane of a photographing optical system of an optical device, between first and second rotating axis and the optical axis of the correction lens.

Now, the calculations in the first and second rotational angle operating sections 104 and 105 are explained, with reference to FIG. 6. FIG. 6 shows two dimensional coordinates on the focal plane of the camera to which the second embodiment is applied. The origin S0 (0, 0) of the coordinates corresponds to the intersection point of the optical axis of the photographing optical system and the focal plane. The point P1 (0, d1), which is the intersection point of the axis of the first pivot shaft 51 and the focal plane, exists on the Y-axis of the coordinates. In FIG. 6, the point P2 (d2, d3) is the intersection point of the axis of the second pivot shaft 61 and the focal plane. When the correction lens 11 is at the standard position, the intersection point of the optical axis OP of the correction lens 11 and the focal plane corresponds to the origin S0. Note that, in FIG. 6, around the first and second pivot shaft 51 and 61, the counterclockwise rotation is operated as a plus component, and the clockwise rotation is operated as a minus component.

The straight line L1 connects the point P1 and the point P2. The angle a1 is an angle by which the Y-axis is rotated to the line L1 around the point P1 in the clockwise direction. The straight line L2 connects the origin S0 and the point P2. The angle α2 is an angle by which the X-axis is rotated to the straight line L2 around the origin S0 in the clockwise direction. The relationship between the straight lines L1 and L2 and the angles α1 and α2 is indicated by the below formulas (1) through (4).

$$L1=\sqrt{(d1-d3)^2+d2^2} \quad (1)$$

$$L2=\sqrt{d2^2+d3^2} \quad (2)$$

$$\alpha1=\mathrm{Sin}^{-1}(d2/L1) \quad (3)$$

$$\alpha2=-\mathrm{Sin}^{-1}(d3/L2) \quad (4)$$

When the correction lens 11 is at the standard position, if the first rotating board 30 is rotated in the counterclockwise direction by an angle θ, the intersection point of the axis of the second pivot shaft 61 and the focal plane is moved from the point P2 to the point P3, and the intersection point of the optical axis OP of the correction lens 11 and the focal plane is moved from the origin S0 to the point S1. After that, if the second rotating board 40 is rotated in the clockwise direction by an angle δ, the intersection point of the optical axis OP of the correction lens 11 and the focal plane is moved from the point S1 to the point S2. The X-axis coordinate XP3 and the Y-axis coordinate YP3 of the point P3 are indicated by the below formulas (5) and (6).

$$XP3=L1\times\mathrm{Sin}(\alpha1+\theta) \quad (5)$$

$$YP3=-L1\times\mathrm{Cos}(\alpha1+\theta)+d1 \quad (6)$$

As the distance between the point P3 and the point S1 is the straight line L2, the X-axis coordinate XS2 and the Y-axis coordinate YS2 of the point S2 are indicated by the below formulas (7) and (8).

$$XS2=L2\times\mathrm{Cos}(\delta+\theta+\alpha2)+XP3 \quad (7)$$

$$YS2=L2\times\mathrm{Sin}(\delta+\theta+\alpha2)+YP3 \quad (8)$$

If the formula (5) is substituted into the formula (7), and the formula (6) is substituted into the formula (8), the X-axis coordinate XS2 and the Y-axis coordinate YS2 of the point S2 are indicated by the below formulas (9) and (10).

$$XS2=L2\times\mathrm{Cos}(\delta+\theta+\alpha2)+L1\times\mathrm{Sin}(\alpha1+\theta) \quad (9)$$

$$YS2=L2\times\mathrm{Sin}(\delta+\theta+\alpha2)-L1\times\mathrm{Cos}(\alpha1+\theta)+d1 \quad (10)$$

The focused image tremble can be corrected by rotating the first and second rotating boards 30 and 40 such that the relationships between the below formulas (11) and (12) are satisfied.

Note that, "x" of the formula (11) is the displacement of the optical axis of the photographing optical system in the lateral direction, obtained by A/D converting and integrating the output signal of the lateral-direction angular speed sensor 100. Namely, "x" is a moving component of the optical axis in the lateral direction, when the focused image tremble occurs.

Further, "y" of the formula (12) is the displacement of the optical axis of the photographing optical system in the lengthwise direction, obtained by A/D converting and integrating the output signal of the lengthwise-direction angular speed sensor 101. Namely, "y" is a moving component of the optical axis in the lengthwise direction, when the focused image tremble occurs.

$$x=K1\times(L2\times\mathrm{Cos}(\delta+\theta+\alpha2)+L1\times\mathrm{Sin}(\alpha1+\theta)) \quad (11)$$

$$y=K2\times(L2\times\mathrm{Sin}(\delta+\theta+\alpha2)-L1\times\mathrm{Cos}(\alpha1+\theta)+d1) \quad (12)$$

(herein, K1: the coefficient which is in inverse proportion to a sampling frequency utilized in the A/D conversion of the output signal of the lateral-direction angular speed sensor, K2: the coefficient which is in inverse proportion to a sampling frequency utilized in the A/D conversion of the output signal of the lengthwise-direction angular speed sensor)

As described above, in the first and second embodiments, the table, which indicates the relations between the moving components x and y in the lateral and lengthwise directions and the rotational angles θ and δ of the first and second rotating boards 30 and 40, is stored in the EEPROM 200.

The rotational angles θ of the first rotating board 30 and the rotational angle 6 of the second rotating board 40 are determined by substituting the numerical values for the lateral-direction moving component x and the lengthwise-direction moving component y in the formulas (11) and (12). Accordingly, a plurality of values which disperse at predetermined intervals are substituted for the moving components x and y in the formulas (11) and (12), then the relations between the combination of the moving components x, y and the combination of the rotational angles θ and δ are obtained. The obtained relations are the contents of the table.

Namely, in the formulas (11) and (12), with respect to the rotating amounts of the rotating boards, the linear-approximation is not performed. As each of the linear moving components in the lateral and lengthwise directions is defined by the two rotational angles θ and δ in the formulas (11) and (12), in theory, no error is generated.

In the prior art, in which one linear moving component is corrected by controlling only one rotating board based on the linear-approximation, errors are generated. However, according to the embodiments of the present invention, the driving amount of the rotating boards can be calculated without errors.

Further, as the calculations of the rotational angles θ and δ are independent, an error generated in one calculation never effects another calculation, though one rotating board is supported on another rotating board. Accordingly, the calculations can be carried out accurately. Further, the arrangement of the pivot shafts of the rotating boards is not limited to one of the first and second embodiments. Namely, with respect to the arrangement of the rotating boards and the driving mechanisms, design restrictions can be lowered.

In the rotational angle operating section 104 of the first rotating board 30 and the rotational angle operating section 105 of the second rotating board 40, the operations described below are carried out: the EEPROM 200 is accessed; the table of the EEPROM 200 is searched based on the angular displacements x and y which are respectively output from the integrating sections 102 and 103; and the rotational angles θ and δ of the first and second rotating boards 30 and 40 are calculated.

If the values of the angular displacements, which are obtained by integrating the output signals of the angular speed sensors 100 and 101 in the integrating sections 102 and 103, do not match the data of the table, the rotational angles θ and δ are calculated by performing a linear interpolation which is well known and is based on two sequential data of the table.

Note that, the first and second embodiments are explained using the examples which are applied to the camera. However, these embodiments can be applied to a monocular, for example, a telescope. Further, theses embodiments can be applied to binoculars and so on, by arranging two tremble correcting devices in parallel.

As described above, according to the present invention, the tremble correction is able to be accurately performed in the tremble correcting device which controls the correction optical system along the plane perpendicular to the optical axis of the correction optical system.

The present disclosure relates to subject matter contained in Japanese Patent Application No.P2001-184927 (filed on Jun. 19, 2001) which is expressly incorporated herein, by reference, in its entirety.

What is claimed is:

1. A focused image tremble correcting device comprising:
a tremble detector that detects a tremble of an optical device;
a correction optical system that is included in an imaging optical system of said optical device and corrects said tremble;
a fixed member that is fixed in said optical device;
a first rotating member that is supported on said fixed member and rotates said correction optical system around a first rotating axis which is parallel to an optical axis of said correction optical system;
a second rotating member that is supported on said first rotating member and rotates said correction optical system around a second rotating axis which is parallel to said optical axis of said correction optical system; and
a controller that calculates a moving component for an object image in a first linear direction on a focal plane of said imaging optical system, said moving component being due to an angular tremble of the optical axis of said imaging optical system, and the calculation being based on the result of said tremble detector, and that cancels said moving component in said first linear direction by controlling rotations of both said first rotating member and said second rotating member.

2. The focused image tremble correcting device according to claim 1, wherein said controller further calculates a moving component in a second linear direction on said focal plane, said first and second linear directions crossing on said focal plane, and calculates a rotational angle for each of said first and second rotating members in order to control both said first and second rotating members such that both said moving component of said object image in said first linear direction and said moving component of said object image in said second linear direction can be canceled.

3. The focused image tremble correcting device according to claim 2, wherein said first linear direction and said second linear direction cross at right angles, and the intersection point of said first and second linear direction corresponds to an intersection point of the optical axis of said imaging optical system and said focal plane.

4. The focused image tremble correcting device according to claim 3, wherein said controller calculates said rotational angles of said first and second rotating members such that said moving component in said first linear direction, said moving component in said second linear direction, said rotational angle of said first rotating member, and said rotational angle of said second rotating member satisfy the formulas to follow:

$$x = K1 \times (L2 \times \cos(\delta + \theta + \alpha 2) + L1 \times \sin(\alpha 1 + \theta))$$

$$y = K2 \times (L2 \times \sin(\delta + \theta + \alpha 2) - L1 \times \cos(\alpha 1 + \theta) + d1)$$

(herein, x: moving component of said object image in said first linear direction,
y: moving component of said object image in said second linear direction,
K1: predetermined proportional coefficient,
K2: predetermined proportional coefficient,
L1: length of a straight line which connects the intersection point of said first rotating axis and said focal plane with the intersection point of said second rotating axis and said focal plane,
L2: length of a straight line which connects the intersection point of said optical axis of said correction optical system and said focal plane with the intersection point of said second rotating axis and said focal plane,
θ: rotational angle of said first rotating board,
δ: rotational angle of said second rotating board, α1: an angle when said second linear direction is rotated in the clockwise direction to a straight line which connects the intersection point of said first rotating axis and said focal plane with the intersection point of said second rotating axis and said focal plane, around the intersection point of said first rotating axis and said focal plane, α2: an angle when said first linear direction is rotated in the clockwise direction to a straight line which connects the intersection point of the optical axis of said imaging optical system and said focal plane with the intersection point of said second rotating axis and said focal plane, around an intersection point of said first linear direction and said second linear direction, d1: distance between the intersection point of said first rotating axis and said focal plane and the intersection point of said optical axis of said imaging optical system and said focal plane).

5. The focused image tremble correcting device according to claim 1, wherein when the optical axis of said correction optical system is coaxial with an optical axis of other optical systems included in said imaging optical system, a straight line, which connects an intersection point of said first rotating axis and a plane perpendicular to the optical axis of said correction optical system with an intersection point of the optical axis of said correction optical system and said perpendicular plane, and a straight line, which connects an intersection point of said second rotating axis and said perpendicular plane with an intersection point of the optical axis of said correction optical system and said perpendicular plane, do not cross at right angles.

6. The focused image tremble correcting device according to claim 1, further comprises:

a first driving mechanism including: a first driving member for rotating said first rotating member around said first rotating axis; and a first urging member for urging said first rotating member to said first driving member; and a second driving mechanism including: a second driving member for rotating said second rotating member around said second rotating axis; and a second urging member for urging said second rotating member to said second driving member.

7. The focused image tremble correcting device according to claim 6, wherein said first driving member is a stepping motor which is fixed on said fixed member;

said first urging member is a coil spring, one end of which is fixed on said fixed member and the other end of which is fixed on said first rotating member;

said second driving member is a stepping motor which is fixed on said first rotating member; and said second urging member is a coil spring, one end of which is fixed on said first rotating member and the other end of which is fixed on said second rotating member.

8. The focused image tremble correcting device according to claim 1, further comprises:

a first supporting mechanism that includes:

a first pivot shaft, the rotating axis of which is said first rotating axis, said first pivot shaft being fixed on said first rotating member, and one end of said first pivot shaft being in contact with a first bearing which is provided on said fixed member;

a first elastic member, being flat, that is provided with a second bearing with which the other end of said first pivot shaft is in contact; and a first supporting element, being fixed on said fixed member, that supports said first elastic member in such a manner that an elastic power of said first elastic member is applied to said first pivot shaft at all times such that said first pivot shaft is urged to said fixed member; and a second supporting mechanism that includes:

a second pivot shaft, the rotating axis of which is said second rotating axis, said second pivot shaft being fixed on said second rotating member, and one end of said second pivot shaft being in contact with a third bearing which is provided on said first rotating member;

a second elastic member, being flat, that is provided with a fourth bearing with which the other end of said second pivot shaft is in contact; and a second supporting element, being fixed on said first rotating member, that supports said second elastic member in such a manner that the elastic power of said second elastic member is applied to said second pivot shaft at all times such that said second pivot shaft is urged to said first rotating member.

9. The focused image tremble correcting device according to claim 8, wherein said one end and said other end of said first pivot shaft are cone-shaped, said first bearing of said fixed member and said second bearing of said first elastic member are tapered, said first pivot shaft is positioned in such a manner that said one end of said first pivot shaft is abutted against the center of said first bearing and said other end of said first pivot shaft is abutted against the center of said second bearing, said one end and said other end of said second pivot shaft are cone-shaped, said third bearing of said first rotating member and said fourth bearing of said second elastic member are tapered, said second pivot shaft is positioned in such a manner that said one end of said second pivot shaft is abutted against the center of said third bearing and said other end of said second pivot shaft is abutted against the center of said fourth bearing.

10. A focused image tremble correcting device comprising:

means for detecting a tremble of an optical device;

a correction optical system that is included in an imaging optical system of said optical device and corrects said tremble;

a fixed member that is fixed in said optical device;

a first rotating member that is supported on said fixed member and rotates said correction optical system around a first rotating axis which is parallel to an optical axis of said correction optical system;

a second rotating member that is supported on said first rotating member and rotates said correction optical system around a second rotating axis which is parallel to said optical axis of said correction optical system; and means for calculating a moving component of an object image in a first linear direction on a focal plane of said imaging optical system, said moving component being due to an angular tremble of the optical axis of said imaging optical system, the calculation being based on the result of said detecting means, and for canceling said moving component in said first linear direction by controlling rotations of both said first rotating member and said second rotating member.

* * * * *